United States Patent

Franks et al.

[15] 3,660,247
[45] May 2, 1972

[54] PROCESS AND APPARATUS FOR CONTROLLING WITH A COMPUTER A DISTILLATION COLUMN PRODUCT AND HEAT FLUID RATES OF FLOW

[72] Inventors: Roger G. E. Franks, Wilmington, Del.; Steven L. Ritchey, Clark, N.J.

[73] Assignee: E. I. du Pont de Nemours and Company, Wilmington, Del.

[22] Filed: July 31, 1970

[21] Appl. No.: 59,941

[52] U.S. Cl. ..........................203/1, 203/DIG. 18, 202/206, 202/181, 235/151.12, 260/453 SP
[51] Int. Cl. .....................................B01d 3/42, C07c 119/04
[58] Field of Search..............203/1, 2, 3, DIG. 18; 202/206, 202/160, 181; 196/132; 62/21, 37; 260/453 SP; 235/151.12

[56] References Cited

UNITED STATES PATENTS

| | | |
|---|---|---|
| 3,143,643 | 8/1964 | Fluegel et al. ...........................203/3 |
| 3,294,648 | 12/1966 | Lupfer et al. ..............................203/2 |
| 3,415,720 | 12/1968 | Rijnsdorp et al................203/DIG. 18 |
| 3,428,528 | 2/1969 | Oglesby et al....................203/DIG. 18 |
| 3,449,215 | 6/1969 | Johnson et al. ..................203/DIG. 18 |

*Primary Examiner*—Wilbur L. Bascomb, Jr.
*Attorney*—Melville J. Hayes

[57] ABSTRACT

A process and apparatus for controlling a distillation column, especially useful for purifying tolylene diisocyanate. The process comprises (a) selectively proportioning both the reboiler steam flow rate and the column bottoms take-off rate to the distillation column feed rate and (b) adjusting the distillate take-off rate in accordance with variations in the distillation column feed rate and deviations in the level of the column bottoms.

4 Claims, 1 Drawing Figure

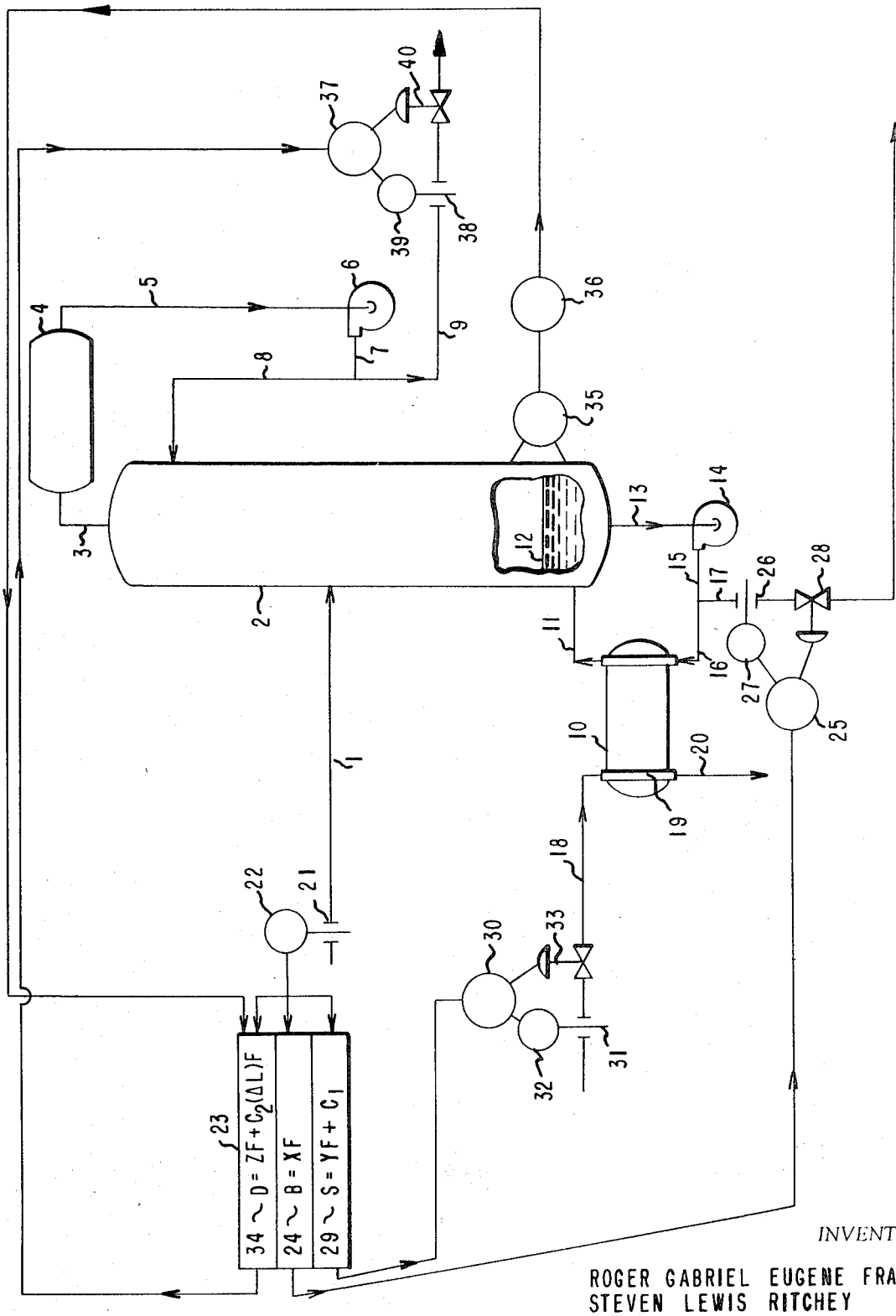

3,660,247

PROCESS AND APPARATUS FOR CONTROLLING WITH A COMPUTER A DISTILLATION COLUMN PRODUCT AND HEAT FLUID RATES OF FLOW

BACKGROUND OF THE INVENTION

This invention relates to a process and an apparatus for controlling a distillation column to be used to purify tolylene diisocyanate or other liquids.

Tolylene diisocyanate is known for its use in the preparation of polyurethane foams. One method of preparing tolylene diisocyanate is to phosgenate m-tolylene diamine in a solvent producing a crude reaction mass containing tolylene diisocyanate, solvent and nonvolatiles. The tolylene diisocyanate is recovered from the crude reaction mass by fractional distillation. The tolylene diisocyanate recovered contains nonvolatile impurities which can range from 20 to 300 parts per million. These impurities are enough to cause discoloration in polyurethane foams made with tolylene diisocyanate. It is, therefore, commercially desirable to reduce the amount of impurities from 20 to 300 parts per million down to a level of about 4 to 100 parts per billion, respectively.

It is known that tolylene diisocyanate can be purified by distillation in a sieve-plate distillation column. The impure tolylene diisocyanate is fed to an intermediate plate in the column. The more volatile material, namely tolylene diisocyanate, is obtained and removed from the top of the still and the nonvolatile or less-volatile materials are obtained and removed from the bottom of the still. If a disturbance occurs; for example, if the temperature of the feed stream changes, the temperature of the cooling water changes, the ambient temperature changes, or a flow measurement is inaccurate, the reflux flow rate can change, thus causing unstable operation of the distillation column. The reflux serves to wash high-boiling impurities down the column where they are removed in the column bottoms. When the amount of reflux decreases below that needed to obtain the desired distillate purity, the resulting distillate is commercially unacceptable.

Many methods are known for the control of a distillation column. A presently used commercial prior art control process includes adjusting the boil-up rate in proportion to the differential pressure occurring between two different selected points in the column. However, corrosion of the numerous small orifices in sieve plates in time can decrease the pressure drop and thus lead to a decrease of the boil-up rate. In another presently-used control process, the distillate purity is maintained by throttling the distillate rate to maintain a pre-determined constant temperature of the liquid on a plate close to the top of the distillation column. This process fails in the purification desired in tolylene diisocyanate because the concentration of high-boiling impurities is too small to affect the tray temperature compared to the small fluctuations normally encountered in practice.

Other control processes use computer-techniques to maintain a material balance around a distillation column. In the simpler process, pre-set values are maintained of the distillate-to-feed, reflux-to-feed, boil-up-to-feed, and tails-to-feed flow ratios. Special flow rate control instruments are commercially available for this purpose. In a more complex control process, the composition of the distillate is analyzed and maintained at a pre-set minimum acceptable value by throttling the distillate flow rate. In purifying tolylene diisocyanate, the desired purity of the product is so high that it is not practical to measure it; thus, it is not practical to base a distillation control system on product analysis. It is also impractical to base a control system on the amount of separation desired because it is impractical to measure the amounts being separated.

SUMMARY OF THE INVENTION

This invention provides a process and apparatus for the control of a distillation column which can be used for the separation of small amounts of high boilers and tars from impure tolylene diisocyanate. The process improves the stability of the column and provides improved reliability in obtaining a purified product.

The invention provides a process for controlling a distillation column having a means to feed an impure liquid material to the column, distillate take-off, bottoms take-off and a steam-heated reboiler to supply heat to the distillation column, consisting essentially of:

A. measuring and transmitting to an analog computer a signal representative of the rate at which said liquid material is being fed to said distillation column, B. measuring the level of the liquid existing in the bottom of the distillation column and transmitting a signal representative of the bottoms liquid level to a controller which compares the signal of the actual liquid level to a predetermined desired level and in turn transmits a signal representative of the deviation of the actual bottoms liquid level from the desired level to the analog computer, C. receiving the signals representing the distillation column feed rate and the deviation of the actual bottoms liquid level from the desired level by the analog computer, automatically proportioning (1) the desired bottoms take-off rate to the distillation column feed rate by the equation $B = xF$ where $B$ = the desired bottoms take-off rate, $x$ = a predetermined function and $F$ = the distillation columns feed rate, (2) the desired steam flow rate to the distillation column feed by the equation $S = yF + C_1$, where $S$ = the desired steam flow rate, $y$ = a predetermined function, $F$ = distillation column feed rate and $C_1$ is a predetermined constant, and (3) the desired distillate take-off rate to the distillation column feed rate and the deviation of the actual bottoms liquid level from the desired level, by the equation $D = zF + C_2 F(\Delta L)$, where $D$ = the desired rate of distillate take-off rate, $z$ = a predetermined a $F$ = distillation column feed rate, $C_2$ is a predetermined constant and $\Delta L$ = percent deviation in bottoms liquid level, and transmitting a signal representing the desired rate of bottoms take-off, the desired steam flow rate, and the desired rate of distillate take-off, D. measuring and transmitting a signal representative of the actual bottoms take-off rate, E. controlling the bottoms take-off rate by accepting the signal from the computer representative of the desired bottoms take-off rate and the signal representing the actual bottoms take-off rate, comparing the signal of the actual bottoms take-off rate to the signal of that desired and transmitting a signal representative of any deviation to adjust the actual bottoms take-off rate until it conforms to that desired, F. measuring and transmitting a signal representative of the actual steam flow rate, G. controlling the steam flow rate by accepting the signal from the computer representing the desired steam flow rate, and the signal representing the actual steam flow rate, comparing the signal of the actual steam flow rate to the signal of that desired, and transmitting a signal representative of any deviation to adjust the actual steam flow rate until it conforms to that desired, H. measuring and transmitting a signal representative of the actual distillate take-off rate, I. controlling the distillate take-off rate by accepting the signal from the computer representing the desired distillate take-off rate, and the signal representing the actual distillate take-off rate, comparing the actual to the desired signal, transmitting a signal representative of any deviation to adjust the actual distillate take-off flow rate until it conforms with that desired.

This invention also provides the apparatus to carry out the process.

BRIEF DESCRIPTION OF THE DRAWING

The drawing is a schematic of a typical distillation column incorporating the control system of this invention.

DETAILS OF THE INVENTION

The invention will be described as it applies to a typical tolylene diisocyanate purification. Referring to the drawing, impure tolylene diisocyanate is fed through conduit 1, into an intermediate region of a sieve-plate distillation column 2. Purified tolylene diisocyante vaporizes leaves the distillation column through conduit 3 and is condensed to a liquid in condenser 4. Liquid tolylene diisocyanate is pumped from condenser 4, through conduit 5, pump 6, and conduit 7, where the stream flow divides directing part of the stream through conduit 8 as reflux back to distillation column 2 and the remaining portion through conduit 9 as recovered, purified tolylene diisocyanate.

Heat is supplied to distillation column 2 by continuously feeding and removing a hot liquid to the bottom of the distillation column. The hot liquid comes from reboiler 10, is fed through conduit 11 into distillation column 2, and a controlled amount of hot liquid 12 is permitted to build up in the bottom of the distillation column. Impurities once contained in the vaporized tolylene diisocyanate collect in the hot liquid 12, and the mixture is drawn from the bottom of the distillation column through conduit 13, pump 14 and conduit 15, where the stream divides and part is fed back to reboiler 10 through conduit 16 and the remaining portion is directed away from the closed-loop process through conduit 17.

The liquid in the reboiler is kept hot by heating it with steam coils. Steam is fed through conduit 18 into steam coils 19 and out through conduit 20.

Control of this distillation column is maintained by the process of this invention wherein the feed rate is set to some desired value and the distillate take-off rate, bottoms take-off rate, and steam flow rate to the reboiler are proportioned to the feed rate; thereafter, if some perturbation occurs in the distillation process, it has been found that the liquid level maintained in the bottom of the still will deviate from its normal level, and this deviation can be measured and used to bring the still back into material balance by using the deviation as a signal to operate a flow control valve to control the distillate take-off rate permitted to leave the closed loop. The amount of flow adjustment made to the distillate take-off is small compared to the total distillate take-off, but it can be twice as much as the bottoms take-off rate. This flow adjustment is thus sufficient to maintain the still in balance when slight perturbations occur. This adjustment is also important in maintaining an adequate liquid level in the reboiler so as to keep the heat transfer surface flooded at all times.

The control system is shown in the drawing wherein the amount of tolylene diisocyanate fed to column 2 is sensed by an orifice plate 21 and a signal representative of the flow rate is transmitted by flow transmitter 22 to analog computer 23.

Because an orifice plate and a differential pressure cell are used, the signal actually transmitted represents the feed rate squared. This occurs because the pressure cell actually measures the difference in pressure across the orifice plate and the feed rate is proportional to the square root of the pressure measured, i.e., $F \propto \sqrt{\Delta P}$; therefore, solving this equation, $\Delta P \alpha F$. The analog computer will accept the signal representing the feed rate squared and convert this signal to the feed rate itself for use in selectively proportioning the bottoms take-off rate, steam flow rate and distillate take-off rate to the tolylene diisocyanate feed rate signal. (In describing the preferred embodiment, an orifice plate and a differential pressure cell are used to measure all of the actual flow rates; therefore, the flow rate signals actually represent the flow rate squared. In each instance where the actual flow rate is measured, the receiving apparatus converts the flow rate squared to the flow rate itself.)

Computer 23 similates three functions which are based on the magnitude of the tolylene diisocyanate feed signal. First the computer calculates the desired rate of bottom flow according to a predetermined and programmed equation 24, namely $B = xF$ where B is the bottoms flow rate, which is equal to a predetermined function $x$ times the tolylene diisocyanate feed rate $F$. A signal representative of the desired bottoms flow rate is then sent from computer 23 to flow controller 25 where it determines the set point for controller 25. The bottoms flow rate is sensed by an orifice plate 26, and a signal representative of the bottoms flow rate is sent by flow transmitter 27 to controller 25 which compares the actual flow rate to the desired flow rate indicated by the set point and transmits a signal to the bottoms flow rate control valve 28 to maintain the bottoms flow rate in accordance with that desired.

The second function performed by computer 23 is to calculate the desired rate of steam flow to reboiler 10 according to a predetermined and programmed equation 29, namely $S = yF + C_1$ where $S$ (the steam flow rate) is equal to a predetermined function $y$ times the tolylene diisocyanate feed rate F, plus some predetermined constant $C_1$. The constant $C_1$ is used to maintain distillation column 2 with a certain minimum reflux rate. A signal representative of the desired steam flow rate is then sent from computer 23 to steam flow rate controller 30 where it determines the set point for controller 30. The steam flow rate is sensed by an orifice plate 31, and a signal representative of the actual steam flow rate is sent by flow transmitter 32 to controller 30 which compares the actual steam flow rate to that desired and transmits a signal to the steam flow rate control valve 33 to maintain the steam flow rate in accordance with that desired.

The third function performed by computer 23 is to calculate the desired amount of distillate take-off according to a predetermined and programmed equation 34, namely, $D = zF + C_2 F(\Delta L)$, where the desired distillate take-off rate, $D$, is equal to a predetermined function $z$ times the tolylene diisocyanate feed rate $F$ plus a predetermined constant $C_2$ times the percent bottoms level offset $\Delta L$ times the tolylene diisocyanate feed rate $F$. The constant $C_2$ is used to provide an adjustment of the distillate rate should the distillate rate and bottoms rate be slightly out of balance with the feed rate. If this occurs, it will show up at once in the bottoms liquid level, and the distillate rate will be adjusted by the equation. In order to make this calculation, the computer not only uses the tolylene diisocyanate feed rate, but also receives a signal indicative of the change in the bottoms level of the distillation column. The amount of liquid used in the bottom of the still is preset to some value sufficient to assure satisfactory operation of the reboiler. The desired liquid level is used as the set point; deviations occuring in the liquid level are transmitted by liquid level transmitter 35 to liquid level controller 36 which compares the detected liquid level to the set point and transmits the percent liquid level deviation, $\Delta L$, to computer 23. Computer 23 then calculates the desired distillation take-off rate by equation 34, namely $D = zF + C_2 F(\Delta L)$ and transmits a signal to the distillate flow controller 37 where it determines the set point of the controller. The actual distillate flow rate is sensed by orifice plate 38, and a signal representative of the actual distillate flow rate is sent by flow transmitter 39 to controller 37, which compares the actual to the desired distillate flow rate and transmits a signal to the distillate flow control valve 40 to maintain the distillate flow rate in accordance with that desired.

The functions $x$, $y$ and $z$ are determined in the following manner:

The material balance around the distillation column can be expressed as:

EQUATION NO. 1

$$F = D + B$$

where $F$ = the rate of feed to the column, $D$ = the rate of distillate take-off and $B$ = the rate of bottoms take-off (all in lbs./hr.).

The material balance for the impurities present in the column can be expressed as:

EQUATION NO. 2

$$FI_F = DI_D + BI_B$$

where $FI_F$ = lbs. impurities in the feed to the the column;
$DI_D$ = lbs. impurities in the distillate take-off; and
$BI_B$ = lbs. impurities in the bottoms take-off.

The function $z$ is obtained by solving Equations 1 and 2 simultaneoulsy as follows:

$$B = F - D$$
$$FI_F = DI_D + (F-D) I_B$$
$$F(I_F - I_B) = D(I_D - I_B)$$
$$D = [(I_F - I_B)/(I_D - I_B)] (F)$$

Therefore, the distillate flow rate is proportional to the feed rate by the function $z$, where $$z = I_F - I_B/I_D - I_B$$

The function $x$ is obtained by solving Equations 1 and 2 simultaneously as follows:

$$D = F - B$$
$$FI_F = (F-B) I_D + BI_B$$
$$F(I_F - I_D) = B(I_B - I_D)$$
$$B = (I_F - I_D/I_B - I_D) (F)$$

Therefore, the bottoms take-off rate is proportional to the feed rate $F$ by the function $x$ where:

$$x = I_F - I_D/I_B - I_D$$

The function $y$ is derived from the following equation:

$$S = \frac{\left[(\lambda_I + C_p \Delta T_R)(R+1)\left(\frac{I_F - I_B}{I_D - I_B}\right) + C_p \Delta T_F\right] F}{\lambda_s}$$

where $S$ = rate of steam flow, $\lambda_l$ = heat of vaporization of the isocyanate, $C_p$ = the heat capacity of the isocyanate, $\Delta T_R$ = the amount of subcooling of the reflux, $R$ = the reflux ratio, $I_F$ = the concentration of impurities in the isocyanate feed,* (* weight fraction) $I_B$ = the concentration of impurities in the bottoms take-off, * (* weight fraction) $I_D$ = the concentration of impurities in the distillate take-off,* (* weight fraction) $F$ = the isocyanate feed rate, $\Delta T_F$ = the difference between the temperature of the isocyanate feed and the boiling point of the liquid isocyanate on the feed tray, and $\lambda_s$ = the heat of vaporization of the steam.

Therefore, the steam flow rate is proportional to the feed rate by the function $y$ where $$y = \frac{\left[(\lambda_I + C_p \Delta T_R)(R+1)\left(\frac{I_F - I_B}{I_D - I_B}\right) + C_p \Delta T_F\right]}{\lambda_s}$$

The constant $C_1$ mentioned above is equal to the steam flow rate at total reflux. If it is assumed that the amount of impurities is constant, then the functions $x$, $y$ and $z$ are constant.

The following example illustrates the process of this invention. All parts and percentages are by weight unless otherwise indicated.

EXAMPLE

As illustrated in the drawing, a typical fractionating distillation column 2 is used. Heat for the distillation process is provided by a forced circulation reboiler 10, which is heated with steam. The column is operated at 25 Torr overhead pressure and 25 Torr differential pressure. Distillate formed is condensed in a condenser 4.

Tolylene diisocyanate containing about 0.1 weight percent nonvolatiles is fed to about the middle of the distillation column 2 at a rate of 10,000 lbs./hr. and a temperature of about 100°C. The reflux rate is 4400 lbs./hr.

The tolylene diisocyanate feed rate is sensed by an orifice plate 21 and transmitted to an analog computer 23 by a flow transmitter 22 consisting of a differential pressure cell. The computer calculates the desired bottoms take-off rate by the formula $B = xF$ where $x = 0.04$, $F = 10,000$ lbs./hr. and $B = 400$ lbs./hr. A signal representing 400 is sent to a bottoms flow rate controller 25 as the set point for the controller. The set point is compared with the actual bottoms flow rate sensed with an orifice plate 26 and transmitted to the controller by a differential pressure transmitter 27. The difference between the signal representing the actual flow rate and the set point represents the signal sent to a bottoms flow control valve 28.

The computer also calculates the desired steam flow rate by the formula $S = yF + C_1$ where $y = 0.194$, $C_1 = 1180$, and $F$ is the feed rate in pounds per hour (10,000). A signal representing $S$ (3,120) is sent to a steam flow rate controller 30 as the set point for the controller. The set point is compared with the actual steam flow sensed by an orifice plate 31 and transmitted to the controller 30 by a differential pressure transmitter 32. The difference between the signal representing the actual flow rate and the set point is the signal sent to a steam flow rate control valve 33.

The level of the liquid in the bottom of the column 2 is measured by a liquid level detector and transmitter 35 which sends a signal representing the liquid level to a controller 36 which compares the signal of the actual liquid level to a manually setpoint and this difference ($\Delta L$) is sent to the computer 23. The computer then calculates the distillate take-off by the formula $D = zF + C_2 (\Delta L)F$ where $z = 0.96$, $C_2 = 0.000379$ (a proportionality constant relating feed rate and column bottoms level deviation to the distillate rate), $F = 10,000$ lbs./hr., and $\Delta L$ is the variable used to maintain the column in balance and in this instance it is 0; therefore, $D = 9,600$ lbs./hr. A signal representing $D$ is sent to a distillate take-off rate controller 37 where it is used as the controller set point.

The actual distillate take-off rate is sensed by an orifice plate 38, and transmitted to the controller 37 by a differential pressure transmitter 39. The difference between the signal representing the actual flow rate and the set point is used to adjust a distillate take-off rate control valve 40 to maintain the distillation column 2 in balance.

When the feed rate of the tolylene diisocyanate is zero, the computer calculates a zero bottoms flow rate, a zero distillate flow rate, and a steam flow rate of 1,180 lbs./hr. This steam flow will maintain the column at a reflux rate of 4,400 lbs./hr.

When the feed rate is reduced 2,000 lbs./hr. below the 10,000 lbs./hr., the bottoms rate immediately reduces to 320 lbs./hr., the steam flow rate reduces to 2,370 lbs./hr., and the distillate take-off rate immediately reduces to 7,680 lbs./hr. The reflux rate is maintained at 4,400 lbs./hr.

When the feed rate of tolylene diisocyanate is returned to 10,000 lbs./hr., the bottoms flow rate immediately returns to 400 lbs./hr., the steam flow rate immediately returns to 3,120 lbs./hr., the distillate take-off rate immediately returns to 9,600 lbs./hr., and the reflux rate remains at 4,400 lbs./hr. This column was operated for 40 continuous hours without producing any defective product.

We claim:

1. A process for controlling a distillation column having a means to feed an impure liquid material to the column, a steam-heated reboiler to supply heat to the distillation column, bottoms take-off, distillate take-off, and a condenser to condense the distillate consisting essentially of:

A. measuring and transmitting to an analog computer a signal representative of the rate at which said liquid material is being fed to said distillation column, B. measuring the level of the liquid existing in the bottom of the distillation column and transmitting a signal representative of the bottoms liquid level to a controller which compares the signal of the actual liquid level to a predetermined desired level and in turn transmits a signal representative of the deviation of the actual bottoms liquid level from the desired level to the analog computer, C. receiving in the analog computer the signals representing the distillation column feed rate and the deviation of the actual bottoms liquid level from the desired level, automatically proportioning in the computer (1) the desired bottoms take-off rate to the distillation column feed rate by the equation $B = xF$ where $B$ = the desired bottoms take-off rate, $x = a$ predetermined function and $F$ = the distillation columns feed rate, (2) the desired steam flow rate to the distillation column feed by the equation $S = yF$ $C$, where $S$ the desired steam flow rate, $y$ a predetermined function, $F$ distillation column feed rate and $C$ is a predetermined constant, and (3) the desired distillate take-off rate to the distillation column feed rate and the deviation of the actual bottoms liquid level from the desired level, by the equation $D$ $zF$ $C$ ($L$)$F$, where $D$ the desired rate of distillate take-off, $z$ a predetermined function, $F$ distillation column feed rate, $C$ is a predetermined constant and $L$ percent deviation in bottoms liquid level, and transmitting signals representing the desired bottoms take-off rate, the desired steam flow rate, and the desired rate of distillate take-off, D. measuring and transmitting a signal representative of the actual bottoms take-off rate, E. controlling the bottoms take-off rate by accepting the signal from the computer representative of the desired bottoms take-off rate and the signal representing the actual bottoms take-off rate and transmitting a signal representative of any deviation to adjust the actual bottoms take-off rate until it conforms to that desired, F. measuring and transmitting a signal representative of the actual steam flow rate, G. controlling the steam flow by accepting the signal representing the actual steam flow rate and the signal from the computer representing the desired steam flow rate, comparing the signal of the actual steam flow rate to the signal of that desired, transmitting a signal representative of any deviation to adjust the actual steam flow rate until it conforms to that desired, H. measuring and transmitting a signal representative of the actual distillate take-off rate, I. controlling the distillate take-off rate by accepting the signal representing the actual distillate take-off and the signal from the computer representing the desired distillate take-off rate, comparing the actual to the desired signal, transmitting a signal representative of any deviation to adjust the actual distillate flow rate until it conforms with that desired.

2. The control process of claim 1 in which the liquid being fed to the distillation column is impure tolylene diisocyanate.

3. The process of claim 2 in which (A) the proportion of the bottoms take-off rate to the distillation column feed rate is in accordance with the equation: $B$ $xF$ where $B$ the bottoms take-off rate, $x$ 0.04, $F$ feed rate to the distillation column; (B) the proportion of the steam flow to the distillation column feed is in accordance with the equation: $S$ $yF$ $C$, where $S$ steam flow rate, $y$ 0.194, $F$ feed rate to the distillation column, and $C$ 1180; (C) the proportion of the distillate take-off rate to the distillation column feed rate is in accordance with the equation: $D$ $zF$ $C$ ( $L$)$F$ where $D$ distillation take-off rate, $z$ 0.96, $F$ feed rate to the distillation column, ( $L$) percent deviation of the bottoms liquid level, and $C$ 0.000379.

4. An apparatus for controlling a distillation column having a means to feed an impure liquid material to the column, bottoms take-off, distillate take-off, a steam heated reboiler to supply heat to the distillation column, and a condenser to condense the distillate consisting essentially of:

A. means for measuring and transmitting to an analog computer a signal representative of the rate at which said liquid material is being fed to said distillation column, B. means for measuring the level of the liquid existing in the bottoms of the distillation column and transmitting a signal representative of the bottoms liquid level to a controller which compares the signal of the actual liquid level to a predetermined desired level and in turn transmits a signal representative of the deviation of the actual bottoms liquid level from the desired level to the analog computer, C. means for receiving the signals representing the distillation column feed rate and the deviation of the actual bottoms liquid level from the desired level by the analog computer, automatically proportioning (1) the desired bottoms take-off rate to the distillation column feed rate by the equation $B$ $xF$ where $B$ the desired bottoms take-off, $X$ a predetermined function and $F$ the distillation column feed rate, (2) the desired steam flow rate to the distillation column feed rate by the equation $S$ $yF$ $C$, where $S$ the desired steam flow rate, $y$ a predetermined function, $F$ distillation column feed rate and $C$ is a predetermined constant, and (3) the desired distillate take-off rate to the distillation column feed rate and the deviation of actual bottoms liquid level from the desired level, by the equation $D$ $zF$ $C$ $F$( $L$), where $D$ the desired rate of distillate take-off, $z$ a predetermined function, $F$ distillation column feed rate, $C$ is a predetermined constant and $L$ percent deviation in bottoms liquid level, and transmitting a signal representing the desired bottoms take-off rate, the desired steam flow rate, and the desired distillate take-off rate, D. means for measuring and transmitting a signal representative of the actual bottoms take-off rate, E. means for controlling the bottoms take-off rate by accepting the signal from the computer representative of the desired bottoms take-off rate and the signal representing the actual bottoms take-off rate and transmitting a signal representative of any deviation to adjust the actual bottoms take-off rate until it conforms to that desired, F. means for measuring and transmitting a signal representative of the actual steam flow rate, G. means for controlling the steam flow rate by accepting the signal representing the actual steam flow rate, and the signal from the computer representing the desired steam flow rate, comparing the signal of the actual steam flow to the signal of that desired, transmitting a signal representative of any deviation to adjust the actual steam flow rate until it conforms to that desired, H. means for measuring and transmitting a signal representative of the actual distillate take-off rate, and I. means for controlling the distillate take-off rate by accepting the signal representing the actual distillate take-off rate, and the signal from the computer representing the desired distillate take-off rate, comparing the actual to the desired signal, transmitting a signal representative of any deviation to adjust the actual distillate flow rate until it conforms with that desired.

* * * * *

UNITED STATES PATENT OFFICE
CERTIFICATE OF CORRECTION

Patent No. 3,660,247                    Dated May 2, 1972

Inventor(s) Roger G. E. Franks and Steven L. Ritchey        -1-

It is certified that error appears in the above-identified patent and that said Letters Patent are hereby corrected as shown below:

IN THE SPECIFICATION

Col. 2, line 34, after *predetermined*, "a" should read -- function , --;

Col. 3, line 59, "$\Delta P d F$" should read -- $\Delta P d F^2$ --;

Col. 5, line 23, " $B = (I_F - I_D/I_B - I_D)$ $(F)$" should read -- $B = I_F - I_D/I_B - I_D$ $(F)$ --;

IN THE CLAIMS

Claim 1, delete paragraph C. and insert:

C. receiving in the analog computer the signals representing the distillation column feed rate and the deviation of the actual bottoms liquid level from the desired level, automatically proportioning in the computer (1) the desired bottoms take-off rate to the distillation column feed rate by the equation $B = xF$ where $B$ = the desired bottoms take-off rate, $x$ = a predetermined function and $F$ = the distillation columns feed rate, (2) the desired steam flow rate to the distillation column feed by the equation $S = yF + C_1$, where $S$ = the desired steam flow rate, $y$ = a predetermined function, $F$ = distillation column feed rate and $C_1$ is a predetermined constant, and (3) the desired distillate take-off rate to the distillation column feed rate and the deviation of the actual bottoms liquid level from the desired level, by the equation $D = zF + C_2 (\Delta L)F$, where $D$ = the desired rate of distillate take-off, $z$ = a predetermined function, $F$ = distillation column feed rate, $C_2$ is a predetermined constant and $\Delta L$ = percent deviation in bottoms liquid level, and transmitting signals representing the desired bottoms take-off rate, the desired steam flow rate, and the desired rate of distillate take-off,

UNITED STATES PATENT OFFICE
CERTIFICATE OF CORRECTION

Patent No. 3,660,247      Dated May 2, 1972

Inventor(s) Roger G. E. Franks and Steven L. Ritchey    Page - 2

It is certified that error appears in the above-identified patent and that said Letters Patent are hereby corrected as shown below:

Claim 3, delete in its entirety and insert:

3. The process of claim 2 in which (A) the proportion of the bottoms take-off rate to the distillation column feed rate is in accordance with the equation: $B = xF$ where $B$ = the bottoms take-off rate, $x = 0.04$, $F$ = feed rate to the distillation column; (B) the proportion of the steam flow to the distillation column feed is in accordance with the equation: $S = yF + C_1$, where $S$ = steam flow rate, $y = 0.194$, $F$ = feed rate to the distillation column, and $C_1 = 1180$; (C) the proportion of the distillate take-off rate to the distillation column feed rate is in accordance with the equation: $D = zF + C_2 (\Delta L)F$ where $D$ = distillation take-off rate, $z = 0.96$, $F$ = feed rate to the distillation column, $(\Delta L)$ = percent deviation of the bottoms liquid level, and $C_2 = 0.000379$.

Claim 4, delete paragraph C. and insert:

C. means for receiving the signals representing the distillation column feed rate and the deviation of the actual bottoms liquid level from the desired level by the analog computer, automatically proportioning (1) the desired bottoms take-off rate to the distillation column feed rate by the equation $B = xF$ where $B$ = the desired bottoms take-off, $x$ = a predetermined function and $F$ = the distillation column feed rate, (2) the desired steam flow rate to the distillation column feed rate by the equation $S = yF + C_1$, where $S$ = the desired steam flow rate, $y$ = a predetermined function, $F$ = distillation column feed rate and $C_1$ is a predetermined constant, and (3) the desired distillate take-off rate to the distillation column feed rate and the deviation of actual bottoms liquid level from the desired level, by the equation $D = zF + C_2 F(\Delta L)$, where $D$ = the desired rate of distillate

UNITED STATES PATENT OFFICE
CERTIFICATE OF CORRECTION

Patent No.  3,660,247            Dated   May 2, 1972

Inventor(s)   Roger G. E. Franks and Steven L. Ritchey    Page - 3

It is certified that error appears in the above-identified patent and that said Letters Patent are hereby corrected as shown below:

take-off, z = a predetermined function, F = distillation column feed rate, $C_2$ is a predetermined constant and $\Delta L$ = percent deviation in bottoms liquid level, and transmitting a signal representing the desired bottoms take-off rate, the desired steam flow rate, and the desired distillate take-off rate, Signed and sealed this 15th day of August 1972.

(SEAL)
Attest:

EDWARD M. FLETCHER, JR.           ROBERT GOTTSCHALK
Attesting Officer                 Commissioner of Patents